United States Patent [19]

Padlo

[11] Patent Number: 4,783,113
[45] Date of Patent: Nov. 8, 1988

[54] VEHICLE CONVERTIBLE TOP BOOT ASSEMBLY HAVING STORAGE COMPARTMENT

[75] Inventor: Craig W. Padlo, Brighton, Mich.
[73] Assignee: Cars & Concepts, Inc., Brighton, Mich.
[21] Appl. No.: 116,406
[22] Filed: Nov. 3, 1987
[51] Int. Cl.⁴ .............................................. B60J 7/20
[52] U.S. Cl. .................... 296/136; 296/37.16
[58] Field of Search ............... 296/136, 37.1, 37.16, 296/24 R

[56] References Cited

U.S. PATENT DOCUMENTS

| | | | |
|---|---|---|---|
| 3,154,341 | 10/1964 | Booth | 296/136 |
| 3,170,726 | 2/1965 | Lystad | 296/136 |
| 3,172,695 | 3/1965 | Bordinat, Jr. | 296/136 |
| 4,479,675 | 10/1984 | Zankl | 296/37.16 |
| 4,512,606 | 4/1985 | Trostle et al. | 296/136 |
| 4,600,233 | 7/1986 | Boydston | 296/37.16 |
| 4,687,247 | 8/1987 | Muscat | 296/136 |

Primary Examiner—Robert R. Song
Attorney, Agent, or Firm—Brooks & Kushman

[57] ABSTRACT

A vehicle convertible top boot assembly (18) is disclosed as including a rigid boot (20) having forward, rearward, and side portions (22, 24, 26) that define an access opening (28) opened and closed by a cover (30) so as to permit storage of articles in a storage receptacle (32). The rigid boot (20) preferably includes a central member (34) and a pair of side members (38) mounted on opposite ends (36) of the central member by detachable connections (40). The cover (30) is preferably pivotally mounted by a hinge (48) at its rear extremity to provide convenience in the storage. The storage receptacle (32) preferably has an upwardly opening shape mounted below the access opening (28) and preferably is constructed as a flexible bag whose upper end has a connection (56) to the boot.

12 Claims, 1 Drawing Sheet

U.S. Patent    Nov. 8, 1988    4,783,113
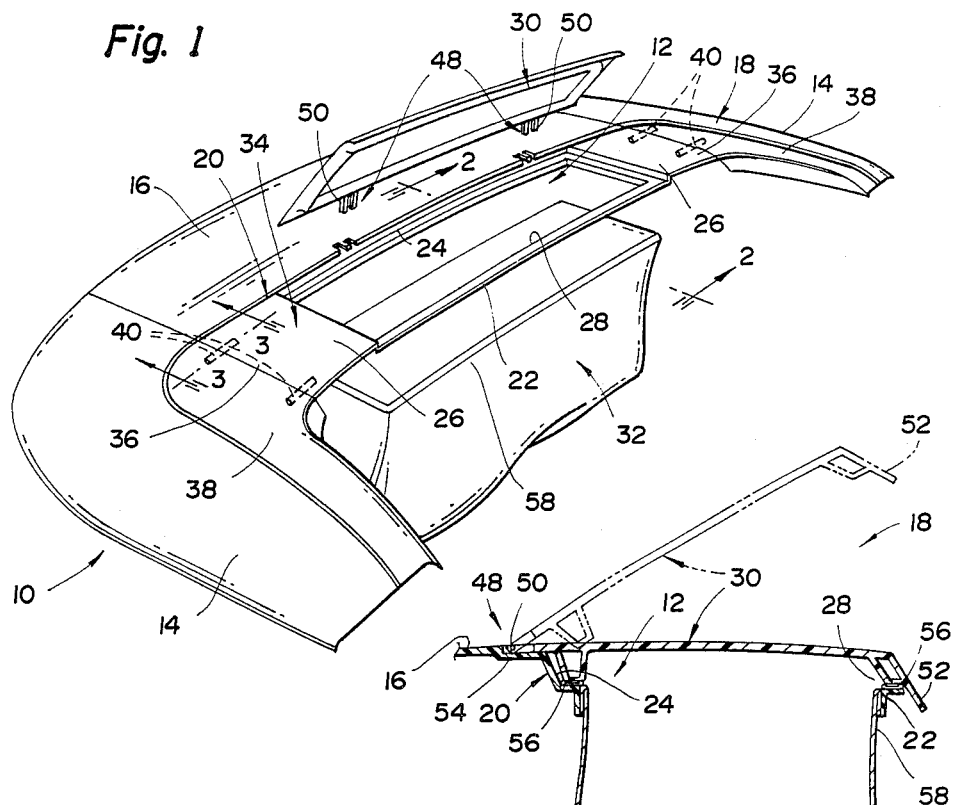
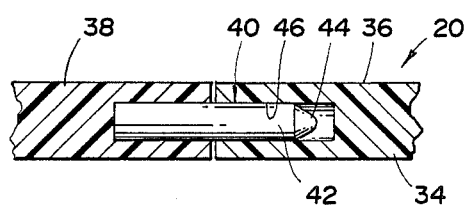
Fig. 3

4,783,113

VEHICLE CONVERTIBLE TOP BOOT ASSEMBLY HAVING STORAGE COMPARTMENT

TECHNICAL FIELD

This invention relates to a boot assembly utilized with a convertible type vehicle to cover its laterally extending convertible top storage well.

BACKGROUND ART

Vehicle convertible tops are conventionally stored in a laterally extending U-shaped storage well of the associated vehicle. Such storage wells in the past for the most part have been covered with a boot of flexible material to provide the vehicle with an aesthetically appealing appearance with the convertible top stored. Convertible top boots of a partially or fully rigid construction have also previously been proposed such as disclosed by U.S. Pat. Nos. 3,170,726 Lystad and 4,512,606 Trostle et al.

Another rigid convertible top boot is disclosed by the U.S. Pat. No. 4,600,233 of Boydston. This rigid boot has a forwardly opening U-shape whose center section provides storage and receives a cover that is held in place by securement of the boot. As such, the center storage area is not readily accessible for opening and closing in order to permit easy storage of articles.

Other prior art references noted by a search conducted for the present invention include: U.S. Pat. Nos. 3,154,341 Booth and 3,172,695 Bordinat, Jr. which both disclose rigid tonneau covers; and U.S. Pat. No. 4,479,675 Zankl which discloses a luggage compartment lid having a cover that is openable in order to permit access to the luggage compartment.

DISCLOSURE OF INVENTION

An object of the present invention is to provide an improved convertible top boot assembly for covering a laterally extending convertible top storage well of a convertible vehicle while also permitting convenient storage of articles without requiring boot detachment.

In carrying out the above object, the convertible top boot assembly of the invention includes a rigid boot that extends laterally to cover the convertible top storage well of the convertible vehicle with which the boot assembly is utilized. This rigid boot includes forward, rearward, and side portions that cooperatively define an access opening. A cover of the boot assembly is movable between open and closed positions with respect to the access opening. A storage receptacle of the boot assembly is located below the opening of the boot to permit storage of articles in the receptacle by opening and closing of the cover with the boot secured over the convertible top storage well.

In its preferred construction, the convertible top boot assembly has its rigid boot constructed to include a laterally elongated central member having opposite ends and a pair of side members respectively mounted on the opposite ends of the central member. The central member of the three-piece boot includes the forward, rearward and side boot portions that define the access opening. The pair of side members of the boot extend forwardly from the opposite ends of the central member to cover the conventional U-shaped convertible top storage well. Detachable connections of the boot assembly provide the mounting of the side members of the boot on the opposite ends of the central member and also permit detachment thereof for storage when the boot assembly is not needed. Each detachable connection includes a projecting pin mounted on one of the members to be connected thereby and a hole in the other member for receiving the projecting pin to provide the detachable connection.

In its preferred construction, the convertible top boot assembly includes a hinge that pivotally mounts the cover on the boot for movement between the open and closed positions. This hinge most preferably includes a pair of laterally spaced hinge connections that pivotally mount the cover adjacent the rear portion of the boot at the rear of the access opening. This pivotal mounting of the hinge thus supports the cover on the central portion of the rigid boot between its opposite ends on which the pair of side members of the boot are mounted by the detachable connections.

The preferred construction of the convertible top boot assembly has its storage receptacle provided with an upwardly opening configuration including an upper connection that provides suspension of the storage receptacle in a downwardly depending relationship from the boot below the access opening. More specifically, the storage receptacle is constructed as a flexible bag having an upper open end that opens below the access opening. The upper connection of the storage receptacle is most preferably of the hook and loop type and secures the upper open end of the flexible bag to the boot below the access opening so that the storage can be accomplished by opening and closing of the cover.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a partial perspective view that illustrates a convertible top boot assembly constructed in accordance with the present invention;

FIG. 2 is a sectional view taken along the direction of line 2—2 in FIG. 1 to illustrate the construction of the boot assembly with a cover thereof shown in a solid line indicated closed position and a phantom line indicated open position; and FIG. 3 is a sectional view taken along the direction of line 3—3 in FIG. 1 to illustrate the construction of a detachable connection of a rigid boot of the boot assembly.

BEST MODE FOR CARRYING OUT THE INVENTION

As illustrated in FIG. 1 of the drawings, a partially illustrated convertible type vehicle is generally indicated by 10 and includes a laterally extending convertible top storage well 12 that is located to the rear of the vehicle occupant compartment so as to receive an associated convertible soft top in its stored or top down position. This convertible top storage well 12 is bounded at its sides by the rear quarter fenders 14 and at its rear extremity by the rear vehicle deck 16, which cooperatively open upwardly and forwardly in a generally U-shaped configuration.

With combined reference to FIGS. 1 and 2, a convertible top boot assembly of the present invention is indicated by 18 and functions to cover the storage well 12. Boot assembly 18 includes a rigid boot 20 that is preferably made from a suitable synthetic resin plastic with a preferred construction that is hereinafter more fully described. Any type of suitable detachable connection is utilized to secure the boot 20 to the vehicle 10 to cover the convertible top storage well 12 with the top stored so that the vehicle occupant compartment is open. The rigid boot 20 includes a forward portion 22, a rearward portion 24, and side portions 26 that cooperatively define an access opening 28. A cover 30 is movable between open and closed positions with respect to the access opening 28 as respectively shown by phantom and solid line representation in FIG. 2. The boot assembly also includes a storage receptacle 32 located below the access opening 28 of the boot 20 to permit storage of articles in the receptacle by opening and closing of the cover 30. This storage is accomplished with the boot 20 secured over the convertible top storage well 12.

The convertible top boot assembly 18 of this invention as is apparent from the above description provides for convenient storage of articles with the convertible top down in its occupant compartment open position. Access to the storage receptacle 32 for storage and retrieval of articles is conveniently provided by the manner in which the cover 30 is opened and closed without requiring any removal of the rigid boot 20. Furthermore, the rigidity of the boot 20 provides a streamlined extension of the adjacent vehicle body contour and thus provides an aesthetically appealing appearance.

In its preferred construction, the convertible top boot assembly has its rigid boot 20 provided with a laterally extending elongated central member 34 having opposite ends 36. This preferred construction of the rigid boot 20 also includes a pair of side members 38 mounted on the opposite ends 36 of the central member 34. Between the side members 38, the central member 34 is constructed so as to include the forward, rearward, and side boot portions 22, 24, and 26 that define the access opening 28. Both of the pair of side members 38 extend forwardly from the opposite ends 36 of the central member 34 of the boot 20 and thus define a U-shaped configuration adjacent the rear extremity of the occupant compartment.

As shown in FIGS. 1 and 3, the boot assembly 18 also preferably includes detachable connections 40 for mounting the side members 38 of the boot 20 on the opposite ends 36 of the central member 34 and for permitting detachment thereof for storage. Thus, the detachable connections 40 are secured upon assembly of the rigid boot 20 in the U-shaped configuration shown in FIG. 1 and are detached from each other when the convertible vehicle top is raised such that storage of the boot is possible. A pair of such detachable connections 40 are utilized between each side member 38 and the associated end 36 of the central member 34 as shown in FIG. 1. Each of these detachable connections 40 as illustrated in FIG. 3 includes a projecting pin 42 that is mounted on one of the members, such as the side member 38 as illustrated, projecting therefrom with a somewhat pointed end 44. This pin end 44 is received within a hole 46 in the other member 34 at its end 36 so as to thereby provide rigidity between the two members during use while still permitting detachment between the members for storing of the boot as previously mentioned.

As best illustrated in FIG. 2, the boot assembly 18 preferably includes a hinge 48 that pivotally mounts the cover 30 for movement between the phantom line indicated open position and the solid line indicated closed position with respect to the access opening 28 of the boot 20. This hinge 48 preferably includes a pair of hinge connections 50 that pivotally mount the cover 30 adjacent the rear portion 24 of the boot 20 at the rear of the access opening 28. At its forward extremity, the cover includes a handle lip 52 that extends downwardly and somewhat forwardly in an inclined orientation for facilitating manual movement of the cover 30 between its open and closed positions. Each of the hinge connections 50 includes a pintle 54 that provides the hinge mounting of the cover 30 at the rear of the access opening 28, either on the rear deck 16 or on the rearward boot portion 24.

As illustrated in both FIGS. 1 and 2, the storage receptacle 32 has an upwardly opening configuration including an upper connection 56 that provides suspension of the storage receptacle in a downwardly depending relationship from the boot 20 below the access opening 28. This storage receptacle 32 is preferably constucted as a flexible bag having an upper end 58 that opens below the access opening 28. The upper connection 56 is most preferably of the hook and loop type such as manufactured under the trademark Velcro and secures the upper open end 58 of the flexible bag receptacle 32 to the boot 20 below the access opening 28.

While the best mode for carrying out the invention has been described in detail, those familiar with the art to which this invention relates will recognize various alternative designs and embodiments for practicing the invention as defined by the following claims.

What is claimed is:

1. A convertible top boot assembly for covering a laterally extending convertible top storage well of a convertible vehicle, the convertible top boot assembly comprising: a rigid boot that extends laterally and is securable to cover the convertible top storage well; the rigid boot including forward, rearward, and side portions that cooperatively define an access opening; a cover movable between open and closed positions with respect to the access opening; and a storage receptacle located below the opening of the boot to permit storage of articles in the receptacle by opening and closing of the cover with the boot secured over the convertible top storage well.

2. A convertible top boot assembly as in claim 1 wherein the rigid boot includes a laterally elongated central member having opposite ends and also includes a pair of side members respectively mounted on the opposite ends of the central member, the central member of the boot including the forward, rearward and side boot portions that define the access opening, and the pair of side members of the boot extending forwardly from the opposite ends of the central member of the boot.

3. A convertible top boot assembly as in claim 2, further including detachable connections for mounting the side members of the boot on the opposite ends of the central member and for permitting detachment thereof for storage.

4. A convertible top boot assembly as in claim 3 wherein each detachable connection includes a projecting pin mounted on one of the members to be connected thereby and a hole in the other member for receiving the projecting pin to provide the detachable connection.

5. A convertible top boot assembly as in any preceding claim further including a hinge that pivotally mounts the cover for movement between the open and closed positions.

6. A convertible top boot assembly as in claim 5 wherein the hinge includes a pair of laterally spaced hinge connections that pivotally mount the cover adjacent the rear portion of the boot at the rear of the access opening.

7. A convertible top boot assembly as in any one of claims 1 through 4 wherein the storage receptacle has an upwardly opening configuration including an upper connection that provides suspension of the storage receptacle in a downwardly depending relationship from the boot below the access opening.

8. A convertible top boot assembly as in claim 7 wherein the storage receptacle comprises a flexible bag having an upper open end that opens below the access opening.

9. A convertible top boot assembly as in claim 8 wherein the upper connection is of the hook and loop type and secures the upper open end of the flexible bag to the boot below the access opening.

10. A convertible top boot assembly for covering a laterally extending convertible top storage well of a convertible vehicle, the convertible top boot assembly comprising: a rigid boot that extends laterally and is securable to cover the convertible top storage well; the rigid boot including forward, rearward, and side portions that cooperatively define an access opening; a cover pivotally mounted for movement between open and closed positions with respect to the access opening; and a flexible bag storage receptacle having an upper end that opens upwardly and is suspended from the boot below the opening thereof to permit storage of articles in the receptacle by opening and closing of the cover with the boot secured over the convertible top storage well.

11. A convertible top boot assembly for covering a laterally extending convertible top storage well of a convertible vehicle, the convertible top boot assembly comprising: a rigid boot that extends laterally to cover the convertible top storage well; the rigid boot including forward, rearward, and side portions that cooperatively define an access opening; a cover; a hinge that pivotally mounts the cover adjacent the rearward portion of the rigid boot for pivotal movement between open and closed positions with respect to the access opening; and a flexible bag storage receptacle having an upper end that opens upwardly and is suspended from the boot below the opening thereof to permit storage of articles in the receptacle by opening and closing of the cover.

12. A convertible top boot assembly for covering a laterally extending convertible top storage well of a convertible vehicle, the convertible top boot assembly comprising: a rigid boot that extends laterally to cover the convertible top storage well; the rigid boot including a laterally extending central portion of an elongated shape having opposite ends; said central portion of the boot having forward, rearward, and side portions that cooperatively define an access opening; the boot also including a pair of side members; detachable connections that detachably secure the side members of the boot to the opposite ends of its central member in a forwardly extending relationship; a cover; a hinge including a pair of laterally spaced hinge connections that pivotally mount the cover adjacent the rearward portion of the rigid boot for pivotal movement between open and closed positions with respect to the access opening; a flexible bag storage receptacle having an upper end that opens upwardly; and a connection that secures the upper end of the flexible bag storage receptacle to the central member of the boot below the opening thereof to permit storage of articles in the receptacle by opening and closing of the cover with the boot secured over the convertible top storage well.

* * * * *